Patented Oct. 19, 1943

2,332,275

UNITED STATES PATENT OFFICE 2,332,275

ISOMERIZATION OF PARAFFINS

Eldon E. Stahly, Baton Rouge, La., assignor to Standard Oil Development Company, a corporation of Delaware No Drawing. Application August 26, 1939, Serial No. 292,100

8 Claims. (Cl. 260—683.5)

The present invention relates to the art of producing iso from normal hydrocarbons and more specifically to a method for isomerizing lower boiling hydrocarbons. The invention will be understood from the following description.

The greater proportion of the lower boiling hydrocarbons of petroleum are straight chain, particularly those of 4 to 7 carbon atoms, and since the iso hydrocarbons, that is containing branched chains, are more valuable because of their anti-detonation qualities and their superior reactivity, it is quite desirable to convert the normal to iso constituents.

Heretofore the best method for accomplishing this lay in the use of aluminum chloride and other Friedel-Crafts agents such as aluminum bromide, ferric chloride and zinc chloride. It has been found that superior results can be obtained by the use of double salt catalysts in which one salt is a Friedel-Crafts catalyst of the class mentioned above and the other an alkali metal halide. These combinations may be complexes, but the proportions of the two ingredients may vary considerably and for purposes of disclosure it seems more desirable to describe the complex from the materials from which it is made. Thus the following materials among others may be used: NaCl—AlCl$_3$, KCl—AlBr$_3$, NaBr—AlCl$_3$, or NaCl—AlBr$_3$. It will be appreciated that sodium chloride is to be preferred to the potassium salt or those of the other metals of the alkali group because of the cheapness and also because it is superior. Aluminum chloride is likewise preferable to the other Friedel-Crafts catalysts, but the others may be employed, if desired.

The proportion of the two types of halides in the double salts affects the activity of the mixture to a considerable extent, and it is found that the best way to prepare the catalysts is to melt the two agents together in a dry atmosphere preferably under pressure. The best proportion of the two agents seems to be from about 1.1 to 2.5 mols of aluminum chloride for each mol of sodium chloride or equivalent. If the mixing and heating are done in an open vessel, slightly more of the volatile Friedel-Crafts halide is added to compensate for volatilization losses. Fusion occurs at about 400° to 450° F. and a clear liquid results. Any excess of alkali halide is filtered out by means of a metal gauze.

The catalyst may be employed in lump or powder form preferably held on suitable carriers such as silica gel, active carbon, asbestos, clay, pumice, alumina or the like, the molten catalyst being poured over the heated granular carrier. Excess of the wetting is poured off and the pellets are cooled in a dry atmosphere.

The reaction is carried out in either the vapor or liquid phase. At temperatures of 300° or higher, say up to about 400°, considerable decomposition occurs, but this may be avoided by using lower temperatures, for example, from about 30° to 250° F. Isomerization takes place over this entire range, but unless a suitable adjustment of temperature and amount of catalyst is used, the time required may be quite long. Furthermore, with different hydrocarbons the rate is different and catalyst activators such as HCl or other hydrogen halides, water or the like should be employed. The time of reaction ordinarily is from ½ to about 30 hours. Using normal butane, the preferred temperature range is from about 150 to 225° F., and with normal pentane a temperature of 30° to 150° is found to be the best.

As indicated before, the feed stock may be either normal butane, normal pentane or other hydrocarbons or mixtures, such as are found in the naphthas. The feed stock may be vaporized and passed over the catalyst at temperatures within the range indicated, but it is generally preferred to effect the reaction in liquid phase, using sufficient pressure to maintain the liquid under the temperature employed. The reaction may be conducted in batch, for example autoclave or bomb. After the reaction the total product is removed and the iso constituents are separated from the normal unconverted hydrocarbons by distillation. The reaction may also be conducted continuously by passing the hydrocarbon through a chamber filled with catalyst or a bed of the same. Separation of normal paraffin and recirculation may be accomplished as before.

The present process is of considerable value to refiners and may be employed to increase the anti-detonation value of normal naphthas. Normal butane and normal pentane may be converted to the iso compounds which are more reactive for alkylation with olefins and since the catalysts disclosed herein are not only suitable for isomerization but likewise for alkylation, a combination process is advantageously provided in which, for example, the normal paraffin is first converted to the iso paraffin in the presence of the catalyst and under the conditions disclosed and olefin is then added to effect the alkylation of the paraffin so produced, preferably under pressure at room temperature or somewhat higher, without any intermediate separation of the catalyst. The olefin added may be a pure olefin or a mixture. While it is preferred to effect this combination in steps, an olefin containing feed stock may be used and the isomerization and alkylation then proceeds in a single stage.

Catalysts of the class described herein will eventually lose their activity and may be regenerated by treatment with hydrogen chloride, or other regenerating agents such as hydrogen bromide, free halogens such as $Cl_2$ or $Br_2$, or organic halogen compounds, for example, alkyl halides.

*Example I*

Normal butane saturated with water is subjected to the action of a catalyst consisting of one mol of sodium chloride to 1.7 of aluminum chloride at 300° F. The product showed considerable decomposition but 25% of the normal butane was converted to iso butane.

*Example II*

Catalyst was prepared by melting together NaCl and $AlCl_3$ in proportion of 1 volume of the former to 1.7 of the latter and then absorbing the clear melt in ¼" pellets of an inorganic absorbent (Celite). The finished catalyst was 80% by weight NaCl 1.7 $AlCl_3$ and 20% carrier. This cataltyst was placed in an electrically heated chamber and liquid normal butane containing HCl was pumped through under pressure, then released to atmospheric pressure and collected in a gas holder. The data for several runs are given below:

|  | Runs | | | | | |
|---|---|---|---|---|---|---|
|  | 1 | 2 | 3 | 4 | 5 | 6 |
| Weight per cent HCl in feed | 0 | 0 | 4.2 | 0 | 3.4 | 14 |
| Pressure, lbs./sq. in | 1,000 | 1,000 | 400 | 1,000 | 400 | 400 |
| Catalyst temperature, °F | 200 | 205 | 203 | 298 | 250 | 200 |
| Vol. of feed/vol. of cat./hr | .95 | .57 | .82 | 1.03 | 1.00 | .85 |
| *Products* | | | | | | |
| Per cent $C_2$ and $C_3$ | 0.0 | 0.7 | 1.4 | 7.3 | 6.8 | 5.9 |
| Per cent iso $C_4H_{10}$ | 8.2 | 14.6 | 16.0 | 24.0 | 48.3 | 50.5 |
| Per cent N. $C_4H_{10}$ | 91.1 | 83.6 | 81.4 | 67.5 | 42.8 | 38.4 |
| Per cent $C_5$ and higher | .7 | 1.1 | 1.2 | 1.2 | 2.1 | 5.2 |
| Per cent selectivity | 92.0 | 89 | 86 | 74 | 84 | 82 |
| Per cent converted | 8.9 | 16.4 | 18.6 | 32.5 | 57.2 | 61.6 |

The operation with the complex salt catalyst is much easier to accomplish, especially continuously, than the operation with $AlCl_3$ alone. In these runs no difficulty was encountered. The apparatus did not plug as is the case with aluminum chloride catalysts.

The present invention is not to be limited to any theory of the mechanism of the reaction or the particular catalyst activator or the like, but only to the following claims in which it is desired to claim all novelty inherent in the invention.

I claim:

1. An improved process for converting normal paraffins to isoparaffins comprising subjecting the normal paraffins containing at least four carbon atoms per molecule in the absence of any substantial amounts of olefins to the action of a Friedel-Crafts type catalyst modified with an alkali metal halide to form a double salt complex while at a temperature below 400° F., the molar ratio of Friedel-Crafts type catalyst to alkali metal halide being between about 1.1:1 and about 2.5:1.

2. A process according to claim 1 in which the catalyst comprises a double salt complex of an aluminum halide and a sodium halide.

3. A process according to claim 1 in which the catalyst comprises a double salt complex of aluminum chloride and sodium chloride.

4. An improved process for isomerizing normal paraffins containing at least four carbon atoms per molecule which comprises subjecting the same in the absence of any substantial amounts of olefins to the action of a Friedal-Crafts type catalyst double salt complex with an alkali metal halide, said Friedal-Crafts type catalyst component being present in a molar ratio to alkali metal halide of between about 1.1:1 and about 2.5:1.

5. A process according to claim 4 in which normal butane is converted to isobutane with a catalyst comprising essentially sodium chloride and aluminum chloride at a temperature between about 150° F. and about 225° F.

6. A process according to claim 4 in which normal pentane is converted to isopentane with a catalyst comprising essentially sodium chloride and aluminum chloride at a temperature between 30° F. and about 150° F.

7. A process which comprises subjecting normal paraffin of at least four carbon atoms per molecule in the absence of substantial amounts of olefins, under isomerization reaction conditions, to the catalytic action of an aluminum halide-alkali metal halide double salt complex in which the molar ratio of aluminum halide to alkali metal halide is between about 1.1:1 and about 2.5:1.

8. A process as in claim 7 in which the catalyst is sodium chloride and aluminum chloride.

ELDON E. STAHLY.